United States Patent
Iki et al.

(10) Patent No.: US 7,776,784 B2
(45) Date of Patent: Aug. 17, 2010

(54) HYDRODESULFURIZATION CATALYST AND HYDRODESULFURIZATION PROCESS FOR GASOLINE FRACTIONS

(75) Inventors: Hideshi Iki, Yokohama (JP); Shigeto Hatanaka, Yokohama (JP); Eitaro Morita, Yokohama (JP); Shinya Takahashi, Yokohama (JP)

(73) Assignees: Nippon Oil Corporation, Tokyo (JP); Petroleum Energy Center, Tokyo (JP)

( * ) Notice: Subject to any disclaimer, the term of this patent is extended or adjusted under 35 U.S.C. 154(b) by 129 days.

(21) Appl. No.: 10/888,972

(22) Filed: Jul. 13, 2004

(65) Prior Publication Data
US 2005/0023192 A1    Feb. 3, 2005

(30) Foreign Application Priority Data
Jul. 14, 2003   (JP)   ............... P2003-274315
Jul. 14, 2003   (JP)   ............... P2003-274316

(51) Int. Cl.
*B01J 23/00*     (2006.01)
*B01J 21/00*     (2006.01)
*B01J 20/00*     (2006.01)
*B01J 29/00*     (2006.01)

(52) U.S. Cl. ............... 502/313; 502/302; 502/303; 502/304; 502/314; 502/315; 502/316; 502/319; 502/320; 502/321; 502/322; 502/323; 502/327; 502/332; 502/335; 502/336; 502/337; 502/338; 502/355; 502/415; 502/439

(58) Field of Classification Search ........ 502/307, 502/302, 304, 325–339, 439, 355, 415, 320, 502/322, 305, 303, 220, 314, 315, 316, 318, 502/313, 319, 321, 323

See application file for complete search history.

(56) References Cited

U.S. PATENT DOCUMENTS 3,766,058 A   10/1973   Hensley, Jr.
3,849,296 A   11/1974   Hensley, Jr.

(Continued)

FOREIGN PATENT DOCUMENTS

| CN | 1123310 A   | 5/1996  |
|----|-------------|---------|
| CN | 1394936 A   | 2/2003  |
| EP | 0 968 764 A1 | 1/2000  |
| GB | 791094      | 2/1958  |
| GB | 1412641     | 11/1975 |
| JP | 48-038884   | 6/1973  |

(Continued)

OTHER PUBLICATIONS

Satsuma A. et al. "Dimethylpyridine-temperature programmed desorption (DMP-TPD) for measurement of strength of Brønsted and Lewis acid sites on metal oxide catalysts," *Applied Catalysis A* 194-195: 253-263 (2000).

*Primary Examiner*—Cam N Nguyen
(74) *Attorney, Agent, or Firm*—Finnegan, Henderson, Farabow, Garrett & Dunner, LLP

(57) ABSTRACT

A hydrodesulfurization catalyst used for hydrodesulfurization of catalytically cracked gasoline comprises a support composed mainly of alumina modified with an oxide of at least one metal selected from the group consisting of iron, chromium, cobalt, nickel, copper, zinc, yttrium, scandium and lanthanoid-based metals, with at least one metal selected from the group consisting of Group 6A and Group 8 metals loaded as an active metal on the support. Hydrogenation of olefins generated as by-products during hydrodesulfurization of the catalytically cracked gasoline fraction, as an important constituent base of gasoline, can be adequately inhibited to maintain the octane number, while sufficiently reducing the sulfur content of the hydrodesulfurized catalytically cracked gasoline fraction.

8 Claims, 1 Drawing Sheet

U.S. PATENT DOCUMENTS

| | | | |
|---|---|---|---|
| 3,993,601 A * | 11/1976 | Long et al. | 502/303 |
| 4,049,542 A | 9/1977 | Gibson et al. | |
| 4,149,965 A | 4/1979 | Pine et al. | |
| 4,177,163 A | 12/1979 | Oleck et al. | |
| 4,555,500 A * | 11/1985 | Kukes | 502/334 |
| 4,591,429 A * | 5/1986 | Ho et al. | 208/254 H |
| 4,602,000 A * | 7/1986 | Dupin et al. | 502/335 |
| 4,698,145 A * | 10/1987 | Ho et al. | 208/18 |
| 4,870,044 A * | 9/1989 | Kukes et al. | 502/220 |
| 4,975,399 A * | 12/1990 | Gardner | 502/38 |
| 4,983,559 A * | 1/1991 | Berrebi | 502/32 |
| 5,089,463 A * | 2/1992 | Johnson | 502/313 |
| 5,106,800 A * | 4/1992 | Moser et al. | 502/53 |
| 5,137,859 A * | 8/1992 | Fujikawa et al. | 502/206 |
| 5,177,047 A * | 1/1993 | Threlkel | 502/200 |
| 5,185,482 A * | 2/1993 | Manzer | 570/168 |
| 5,208,203 A * | 5/1993 | Horiuchi et al. | 502/302 |
| 5,280,004 A * | 1/1994 | Iino et al. | 502/314 |
| 5,352,354 A | 10/1994 | Fletcher et al. | |
| 5,436,215 A * | 7/1995 | Dai et al. | 502/317 |
| 5,453,411 A * | 9/1995 | Dai et al. | 502/315 |
| 5,474,670 A * | 12/1995 | Daage et al. | 208/210 |
| 5,484,756 A * | 1/1996 | Isomae | 502/314 |
| 5,494,875 A * | 2/1996 | Usui et al. | 502/206 |
| 5,498,586 A * | 3/1996 | Dai et al. | 502/313 |
| 5,525,211 A * | 6/1996 | Sudhakar et al. | 208/217 |
| 5,534,475 A * | 7/1996 | Miramontes Cardenas et al. | 502/304 |
| 5,620,592 A * | 4/1997 | Threlkel | 208/216 PP |
| 5,677,259 A * | 10/1997 | Yamase et al. | 502/313 |
| 5,681,787 A * | 10/1997 | Seamans et al. | 502/33 |
| 5,733,839 A * | 3/1998 | Espinoza et al. | 502/336 |
| 5,837,641 A * | 11/1998 | Gosling et al. | 502/219 |
| 5,851,949 A * | 12/1998 | Galperin et al. | 502/333 |
| 6,037,306 A * | 3/2000 | Xia et al. | 502/315 |
| 6,209,494 B1 * | 4/2001 | Manikowski et al. | 123/3 |
| 6,218,335 B1 * | 4/2001 | Okada et al. | 502/340 |
| 6,235,962 B1 * | 5/2001 | Zeuthen | 585/700 |
| 6,267,874 B1 | 7/2001 | Iijima et al. | |
| 6,281,158 B1 * | 8/2001 | Gabrielov et al. | 502/216 |
| 6,290,841 B1 * | 9/2001 | Gabrielov et al. | 208/213 |
| 6,398,950 B1 * | 6/2002 | Iwamoto et al. | 208/216 R |
| 6,436,870 B1 * | 8/2002 | Iijima et al. | 502/305 |
| 6,537,945 B2 * | 3/2003 | Singleton et al. | 502/327 |
| 6,596,667 B2 * | 7/2003 | Bellussi et al. | 502/332 |
| 6,673,237 B2 * | 1/2004 | Liu et al. | 208/213 |
| 6,683,024 B1 * | 1/2004 | Khare et al. | 502/400 |
| 6,706,660 B2 * | 3/2004 | Park | 502/304 |
| 6,818,589 B1 * | 11/2004 | Gillespie | 502/326 |
| 7,005,059 B1 * | 2/2006 | Quartararo et al. | 208/213 |
| 7,074,735 B2 * | 7/2006 | Brignac et al. | 502/31 |
| 7,074,740 B2 * | 7/2006 | Gibson et al. | 502/322 |
| 7,138,353 B2 * | 11/2006 | Takeshima et al. | 502/64 |
| 7,156,887 B1 * | 1/2007 | Petch et al. | 48/198.1 |
| 7,348,288 B1 * | 3/2008 | Kittrell | 502/102 |
| 7,452,844 B2 * | 11/2008 | Hu et al. | 502/327 |
| 2002/0000397 A1 * | 1/2002 | Sherwood, Jr. et al. | 208/216 PP |
| 2003/0171216 A1 * | 9/2003 | Park | 502/355 |
| 2003/0186804 A1 * | 10/2003 | Wagner et al. | 502/300 |

FOREIGN PATENT DOCUMENTS

| | | |
|---|---|---|
| JP | 61038627 A | 2/1986 |
| JP | 5317712 A | 12/1993 |
| JP | 6080972 A | 3/1994 |
| JP | 6212173 A | 8/1994 |
| JP | 6-509830 | 11/1994 |
| JP | 7194979 A | 8/1995 |
| JP | 8224471 A | 9/1996 |
| JP | 08-277395 | 10/1996 |
| JP | 11092772 A | 4/1999 |
| JP | 2000-505358 | 5/2000 |
| JP | 2000505358 T | 5/2000 |
| JP | 2000-239668 | 9/2000 |
| WO | WO01/91899 | 12/2001 |

* cited by examiner

HYDRODESULFURIZATION CATALYST AND HYDRODESULFURIZATION PROCESS FOR GASOLINE FRACTIONS

BACKGROUND OF THE INVENTION

1. Field of the Invention

The present invention relates to a hydrodesulfurization catalyst and hydrodesulfurization process for gasoline fractions.

2. Related Background Art

Emission standards are currently being established throughout the world for greenhouse gases such as carbon dioxide, and reduction measures for such gases are becoming an increasingly important topic. One such reduction measure is to control carbon dioxide emissions from transportation internal combustion engines which run on gasoline, and improved engine fuel efficiency is an essential condition for achieving this. It is believed that new systems such as direct injection engines or lean burn engines, which offer relatively enhanced fuel efficiency, will become even more prevalent in the future.

Nevertheless, such new systems pose a problem in that $NO_x$ gases cannot be sufficiently removed by using conventional three-way catalysts as $NO_x$ removal catalysts for exhaust gas. Although several novel $NO_x$ removal catalysts have been proposed to deal with this problem, such $NO_x$ removal catalysts are generally contaminated by sulfur, which lowers the $NO_x$ removal activity. This has required further removal of sulfur of the gasoline fuel itself, and in recent years some discussion has regarded the need for gasoline with a sulfur content of no greater than 10 ppm by weight ("sulfur-free gasoline").

Incidentally, processes for production of gasoline stocks include appropriate treatment of gasoline fractions obtained by reforming straight run gasoline fractions yielded from distillation of crude oil, or treatment of gasoline fractions obtained by cracking heavy oil. Of the product oils yielded by such processes, catalytically cracked gasoline fractions obtained by fluid catalytic cracking (FCC) are characterized by having rich olefin and aromatic component contents compared to straight run gasoline, as well as a high octane number.

However, when it is attempted to accomplish hydrodesulfurization of gasoline fractions containing olefin components, hydrogenation of the olefins occurs simultaneously with the hydrodesulfurization reaction. This has led to a serious problem in which the octane number of the gasoline fraction obtained by the hydrodesulfurization process is reduced. The hydrodesulfurization process for gasoline fractions including catalytically cracked gasoline fractions must be selective by preventing hydrogenation of the olefin components while promoting only the hydrodesulfurization reaction. Such a process is also known as "selective hydrodesulfurization process".

Technologies such as the following have been disclosed to meet the demands for selective hydrodesulfurization. For example, Japanese Translation of PCT publication No. HEI 6-509830 describes a process for restoring the octane number reduced by hydrogenation treatment, by carrying out a catalyst reforming step or isomerization step after the hydrogenation treatment. Also, Japanese Patent Application Laid-Open No. 2000-239668 describes a process for production of gasoline fractions which comprises a step of hydrogenation of the unsaturated sulfur-containing compounds and a step of decomposing the saturated sulfur-containing compounds. There have also been proposed a process of using a molybdenum and cobalt catalyst having controlled support volume and support surface area (see Japanese Translation of PCT publication No. 2000-505358), a process for preventing octane number reduction by combination with a zeolite catalyst (see U.S. Pat. No. 5,352,354) and a process of using a catalyst subjected to specific pretreatment (see U.S. Pat. No. 4,149,965).

SUMMARY OF THE INVENTION

However, the present inventors have found that with the prior art processes described in these patent publications, reduction in octane number cannot be adequately prevented even if the sulfur content of the gasoline fraction is successfully reduced to below 10 ppm by weight. In addition, these prior art processes require construction of special apparatuses and the. operating conditions must be managed for each step, and hence they are not necessarily efficient in terms of equipment investment cost.

It is an object of the present invention to provide a hydrodesulfurization catalyst and hydrodesulfurization process for gasoline fractions which exhibit high selective hydrodesulfurization power, whereby hydrogenation of olefins generated as by-products during hydrodesulfurization of the catalytically cracked gasoline fraction, as one of the important constituent bases of gasoline, can be adequately inhibited to maintain the octane number, while sufficiently reducing the sulfur content of the hydrodesulfurized catalytically cracked gasoline fraction.

As a result of much diligent research directed toward achieving the object stated above, the present inventors have completed this invention based on the discovery that it is possible to adequately prevent only hydrogenation of olefins without inhibiting the hydrodesulfurization reaction, by using a catalyst having the support modified with a specific metal oxide, for hydrodesulfurization of gasoline fractions.

The hydrodesulfurization catalyst for gasoline fractions according to the invention comprises a support composed mainly of alumina, a metal oxide containing at least one metal selected from the group consisting of iron, chromium, cobalt, nickel, copper, zinc, yttrium, scandium and lanthanoid-based metals, for modification of the support, and at least one active metal selected from the group consisting of Group VIA(6A) and Group VIII(8) metals, loaded on the support. The ratio of the weight of the metal oxide with respect to the weight of the support is more preferably 1-30 wt %.

The metal oxide used is preferably a metal oxide containing at least one metal selected from the group consisting of copper, zinc, yttrium, lanthanum, cerium, neodymium, samarium and ytterbium, more preferably a metal oxide containing at least one metal selected from the group consisting of copper, zinc, yttrium, cerium and ytterbium, and furthermore preferably ytterbium oxide or cerium oxide, with ytterbium oxide being most preferred for use. A hydrodesulfurization catalyst for gasoline fractions which employs such metal oxides will tend to exhibit very high hydrodesulfurization selectivity. Use of cerium oxide leads to improved economic benefits.

The hydrodesulfurization catalyst for gasoline fractions according to the invention is preferably used for hydrodesulfurization of gasoline fractions of which at least 70 vol % consists of a catalytically cracked gasoline fraction, since this will allow its effect to be exhibited to a greater degree.

In addition, the hydrodesulfurization catalyst preferably comprises, as active metals, at least one metal selected from the group consisting of Group VIA metals loaded at 10-20 wt % in terms of its metal oxide with respect to the weight of the hydrodesulfurization catalyst, and at least one metal selected from the group consisting of Group VIII metals loaded at 3-6 wt % in terms of its metal oxide with respect to the weight of the hydrodesulfurization catalyst.

The hydrodesulfurization catalyst is preferably obtained by adding the metal oxide to an alumina precursor and then calcining the mixture to yield a support modified with the metal oxide, and loading the active metal(s) onto the support.

Although the factors responsible for the high hydrodesulfurization selectivity exhibited by the hydrodesulfurization catalyst of the invention are not fully understood at the present time, the conjecture of the present inventors is as follows. It is believed that activity of hydrogenation is reduced because the metal oxide used to modify the support interacts selectively with the active sites of hydrogenation of the olefins. At the same time, presumably, it inhibits reaction with hydrogen sulfide by-product which is responsible for production of mercaptans, one of the reasons for lower desulfurization efficiency. There is no particular limitation, however, to these conjectured factors.

In the hydrodesulfurization process for gasoline fractions according to the invention, a gasoline fraction is subjected to hydrogenation treatment in the presence of the desulfurization catalyst for gasoline fractions described above, under reaction conditions with a reaction pressure of 1-5 MPa, an LHSV of 1-10 $h^{-1}$, a reaction temperature of 190-300° C. and a hydrogen/oil ratio of 100-600 NL/L, so that the catalyst exhibits activity of at least 90% desulfurization efficiency and a hydrogenation rate of no greater than 40%. The sulfur content in the obtained product oil is preferably no greater than 10 ppm by weight.

DESCRIPTION OF THE PREFERRED EMBODIMENTS

Figure 1:
FIG. 1 is a schematic illustration of a hydrodesulfurization catalyst according to a preferred embodiment of the invention.

Preferred embodiments of the invention will now be explained in detail.

First, a preferred embodiment of a hydrodesulfurization catalyst for gasoline fractions according to the invention (hereinafter referred to simply as "desulfurization catalyst") will be described. This embodiment of the desulfurization catalyst comprises a support composed mainly of alumina, from the standpoint of increasing the specific area of the catalyst. The alumina is preferably porous γ-alumina (γ-$Al_2O_3$), but α-alumina, β-alumina, amorphous alumina or the like may be used instead.

The support may also contain silica ($SiO_2$), silica-alumina ($SiO_2/Al_2O_3$), boria ($B_2O_3$), titania ($TiO_2$), magnesia (MgO) or compound oxides thereof, and may also contain phosphorus. The contents of these substances are preferably no greater than 5 wt % with respect to the weight of the support. If their contents exceed 5 wt % with respect to the support weight, acidic substances will be generated on the desulfurization catalyst resulting in accelerated coke production, and thereby affecting the hydrodesulfurization activity of the desulfurization catalyst.

The alumina serving as the main component of the support may be formed via an alumina intermediate obtained by a method of neutralizing or hydrolyzing an aluminum salt or aluminate or a method of hydrolyzing an aluminum amalgam or aluminum alcoholate. Also, a commercially available alumina intermediate or boehmite powder may be used as the alumina precursor.

The support of the desulfurization catalyst of this embodiment is modified with a metal oxide containing at least one metal selected from the group consisting of iron, chromium, cobalt, nickel, copper, zinc, yttrium, scandium and lanthanoid-based metals. The support of the desulfurization catalyst of this embodiment is preferably modified with a metal oxide containing at least one metal selected from the group consisting of copper, zinc, yttrium, lanthanum, cerium, neodymium, samarium and ytterbium, more preferably modified with a metal oxide containing at least one metal selected from the group consisting of copper, zinc, yttrium, cerium and ytterbium, furthermore preferably modified with ytterbium oxide or cerium oxide, and even more preferably modified with ytterbium oxide. Since cerium content in the typical rare-earth minerals, i.e. monazite, bastnäsite and xenotime, is higher than other rare-earth elements, cerium is inexpensively obtainable. (referred to "The economics of Rare Earths & Yttrium, 9th Edition", Roskill Information Services, London (1994)) The ratio of the weights of these metal oxides with respect to the weight of the support is preferably 0.3-30 wt %, more preferably 0.5-20 wt %, even more preferably 0.7-10 wt % and most preferably 0.9-7 wt %. If the weight ratio of metal oxides is greater than 30 wt %, the hydrodesulfurization activity of the desulfurization catalyst will tend to be reduced. If the weight ratio of metal oxides is less than 0.3 wt %, it is possible that no improvement in hydrodesulfurization selectivity will be achieved by the modification.

While the mechanism by which the desulfurization catalyst exhibits high selectivity according to this embodiment has not been elucidated, the following mechanism may be considered as an example. Presumably, the metal oxides interact selectively with the active sites of hydrogenation of the olefins, thereby lowering their activity. At the same time, reaction with hydrogen sulfide by-product which is responsible for production of mercaptans, one of the reasons for lower desulfurization efficiency, is inhibited.

The desulfurization catalyst of this embodiment comprises at least one metal selected from the group consisting of Group VIA and Group VIII metals, supported as an active metal. It preferably has supported at least one metal selected from the group consisting of Group VIA metals and at least one metal selected from the group consisting of Group VIII metals. As specific examples of combinations of such active metals there may be mentioned cobalt-molybdenum, nickel-molybdenum, cobalt-tungsten, nickel-tungsten, cobalt-nickel-molybdenum and the like. Among these, the combination of cobalt-molybdenum is particularly preferred because it will tend to notably increase the hydrodesulfurization activity and prevent olefin hydrogenation reaction.

There are no particular restrictions on the amounts of active metals supported, but they are preferably 10-20 wt % of Group VIA metals and 3-6 wt % of Group VIII metals, preferably 12-18 wt % of Group VIA metals and 3.5-5.5 wt % of Group VIII metals and more preferably 13-17 wt % of Group VIA metals and 4-5.3 wt % of Group VIII metals, in terms of those metal oxides with respect to the weight of the desulfurization catalyst.

The desulfurization catalyst of this embodiment as described above may be prepared by a conventional method, such as the following, for example. First, the support is obtained by preparing an "alumina precursor" such as an alumina gel solution, boehmite powder or an alumina suspension or kneaded mixture by a conventional method. Next, for introduction of the metal oxide(s) used to modify the support, a solution of acetates, chlorides, nitrates, sulfates, naphthenates, trifluoromethansulfonates or coordination compounds of the metal(s) in water or an organic solvent is added by addition to the alumina precursor or by coprecipitation or the like.

When a metal oxide used to modify the support is an oxide of iron, chromium, cobalt, nickel, copper or zinc, a nitrate, acetate or chloride is preferred among the salts mentioned above, with nitrates and acetates being more preferred. When a metal oxide used to modify the support is an oxide of yttrium, scandium or a lanthanoid-based metal, an acetate or nitrate is preferred among the salts mentioned above, and an acetate is more preferred. In this case, however, trace residue of the corresponding anion of the nitrate or chloride will lower the acidity of the alumina surface, often affecting the hydrodesulfurization selectivity.

The mix may be kneaded, dried, molded, calcined, etc. as necessary to obtain the support. The metal oxide(s) modifying the support may also be introduced after firing the support, by dissolving the acetate, chloride, nitrate, sulfate, naphthenate, trifluoromethansulfonate, coordination compound, etc. of the metal(s) in water or an organic solvent and impregnating the support with the solution.

Modification of the support with such metal oxides is preferably carried out before impregnating the support with the Group VIA metal or Group VIII metal described below. This will prevent the metal oxides from covering the active sites consisting of the Group VIA metal or Group VIII metal and thereby reducing the desulfurization activity.

Next, as the starting material for the active metal, there is prepared an aqueous solution of a carbonic acid salt, nitric acid salt, sulfuric acid salt, organic acid salt or oxide of the active metal, or a solution thereof obtained using an aqueous organic solvent or a non-aqueous organic solvent. The starting material for the active metal may be loaded on the support by a loading method ordinarily used for hydrodesulfurization catalysts, such as impregnation or ion-exchange. When a plurality of metals are loaded, they may be loaded simultaneously using a mixed solution, or they may be loaded in succession using simple solutions. The loading of the active metal on the support may be accomplished after completion of the total preparation process for the support, or a step of gel preparation, thermal compression, kneading or the like may be carried out after loading the active metal on an appropriate oxide, compound oxide, zeolite or the like, during a intermediate step in preparing the support. A preferred method is one wherein the active metal is loaded on the support after completion of the total preparation process for the support. A desulfurization catalyst according to this embodiment can also be obtained by calcining the impregnated active metal under prescribed conditions.

The mean pore diameter, pore volume or specific area of the desulfurization catalyst of this embodiment can be adjusted by varying the conditions during preparation of the desulfurization catalyst, similar to prior art methods.

The mean pore diameter of the desulfurization catalyst is preferably 3-10 nm and more preferably 5-9 nm. If the mean pore diameter is smaller than 3 nm, the reaction molecules will tend to disperse inadequately in the pores, while if it is larger than 10 nm, the surface area of the desulfurization catalyst will tend to be reduced, leading to lower activity.

The pore volume of the desulfurization catalyst of this embodiment is preferably 0.3 mL/g or greater. If the pore volume is below this range, impregnation of the metal into the desulfurization catalyst will tend to become difficult.

The specific area of the desulfurization catalyst is preferably at least 200 $m^2/g$. From the standpoint of the activity of the desulfurization catalyst, the specific area is preferably as high as possible. If the specific area is less than 200 $m^2/g$, the area capable of supporting the active metal is reduced, tending to result in notably reduced activity. The specific area and the pore volume of the desulfurization catalyst are measured by a nitrogen gas adsorption method based on BET method. The mean pore diameter is calculated from the specific area and the pore volume.

After preparing the desulfurization catalyst of this embodiment in the manner described above, it may be molded into spheres, pellets, cylinders or the like having a prescribed shape and size. Appropriate molding of the catalyst will allow adjustment of the differential pressure between the entrance and exit ports of the reaction column (or reactor) of the hydrogenation treatment apparatus described hereunder, when multiple molded catalysts are packed into the reaction column. FIG. 1 is an illustration of desulfurization catalysts according to this embodiment, which have been molded into "cloverleaf" cylinders.

The desulfurization catalyst of this embodiment may be used as a desulfurization catalyst for hydrodesulfurization after pre-sulfurization by a method similar to that employed with ordinary hydrodesulfurization catalysts. The pre-sulfurization is accomplished, for example, by circulating straight run naphtha or a sulfurizing agent, or a mixture thereof, through the desulfurization catalyst and applying heat of 180° C. or above under hydrogen pressurization according to a prescribed procedure. This pre-sulfurization sulfurizes the active metal on the desulfurization catalyst to allow its hydrodesulfurization activity to be exhibited. The sulfurizing agent used will generally be a sulfur compound such as dimethyl disulfide or a polysulfide. The desulfurization catalyst may be pre-sulfurized before being filled into the catalyst layer for the hydrodesulfurization process, or it may be subjected to activation treatment with a sulfur-containing, oxygen-containing or nitrogen-containing organic solvent.

The catalyst of the embodiment described above exhibits high hydrodesulfurization selectivity which allows the sulfur components in gasoline fractions to be sufficiently removed by hydrodesulfurization reaction while adequately preventing hydrogenation of the olefin components. Thus, gasoline fractions obtained using the catalyst satisfactorily meet the demands for sulfur-free gasoline, while avoiding octane number reduction and therefore maintaining a sufficiently high octane number.

An embodiment of the hydrodesulfurization process for gasoline fractions (hereinafter referred to as "desulfurization process") of the invention will now be explained. The desulfurization process according to this embodiment involves passing gasoline fractions as feed oil through a catalyst layer packed with hydrogen gas and a hydrodesulfurization catalyst according to the invention, under prescribed reaction conditions, for hydrogenation treatment to obtain an product oil.

According to this embodiment, the gasoline fractions used as the feed oil preferably include a gasoline fraction effluent from a fluid catalytic cracking (FCC) apparatus, from the standpoint of more notably exhibiting the effect of the desulfurization catalyst. The gasoline fractions will normally have a sulfur content of about 10-1000 ppm by weight. The sulfur content may be in the form of, for example, thiophene, alkylthiophenes, benzothiophene, alkylbenzothiophenes, thiacyclopentane, alkylthiacyclopentanes, mercaptan compounds or sulfide compounds. The olefins in the gasoline fractions may be n-olefins or isoolefins.

The gasoline fractions preferably have a sulfur content of no greater than 250 ppm by weight, and more preferably no greater than 200 ppm by weight. If the sulfur content is greater than 250 ppm by weight, higher desulfurization efficiency will be required. The consequent reaction temperature increase required will tend to accelerate hydrogenation of olefins.

The olefin content in the gasoline fractions is preferably 10-50 vol %, more preferably 15-45 vol % and even more preferably 20-40 vol %. An olefin content of less than 10 vol % will tend to prevent the effect of the invention from being adequately exhibited. If the olefin content is greater than 50 vol %, it may not be possible to adequately prevent hydrogenation of the olefins. This will tend to accelerate addition reaction to the olefins by hydrogen sulfide produced as a by-product of thiophene compound desulfurization, thus hindering the hydrodesulfurization reaction.

The feed oil used for this embodiment may also contain fractions with boiling points of about 30-250° C., such as gasoline fractions obtained from atmospheric distillation apparatuses, gasoline fractions produced from hydrogenation purification apparatuses, or gasoline fractions produced by thermal cracking. The feed oil preferably has a catalytically cracked gasoline fraction content of at least 70 vol %, and more preferably at least 80 vol %, from the standpoint of more notably exhibiting the effect of the desulfurization catalyst. If the catalytically cracked gasoline fraction is less than 70 vol %, the low olefin content of the feed oil will tend to prevent the effect of the invention from being adequately exhibited.

The boiling point range for the gasoline fractions of the feed oil used for this embodiment is not particularly restricted so long as it is an ordinary boiling point range for gasoline fractions, but preferably the initial boiling point is 30° C. or higher and the stop point is no higher than 250° C. If the initial boiling point is below 30° C., it will tend to be difficult to satisfy the standards of vapor pressure or distillation characteristics according to the gasoline standards established by JIS K2202, "Automobile Gasoline". On the other hand, a stop point of higher than 250° C. will also make it difficult to satisfy the standard of vapor pressure according to the gasoline standards established by JIS K2202, while it will also increase the content of high boiling point compounds exhibiting low desulfurization reactivity, and will therefore tend to hinder the desulfurization itself.

The term "sulfur content" as used throughout the present specification refers to the weight content of sulfur components based on the total gasoline fractions, as measured according to JIS K2541, "Sulfur Content Test Method" or the method described in ASTM-D5453. The term "desulfurization efficiency" is defined by the following formula (1), where $S_0$ is the sulfur content in the feed oil and S is the sulfur content in the product oil.

(Desulfurization efficiency) <%>=100−(S/S$_0$)×100    (1)

The term "olefin content" refers to the value estimated from the bromine number based on the gasoline fractions, as measured according to JIS K2605, "Petroleum Product Bromine Number Test Method-Electrotitration" or the method described in ASTM-D1492. The "olefin hydrogenation rate" which represents the degree of hydrogenation of the olefin content in the feed oil, is defined by the following formula (2), where $B_0$ is the bromine number of the feed oil, and B is the bromine number of the product oil.

(Olefin hydrogenation rate) <%>=100−(B/B$_0$)×100    (2)

The octane number of the gasoline fractions is measured by the Research Method, and more specifically, it is measured according to JIS K2280, "Octane Number and Cetane Number Test Method and Cetane Index Calculating Method", or the method described in ASTM-D2699.

The catalytically cracked gasoline fraction used in the feed oil will tend to have a greater sulfur content in its heavy gasoline fraction (high boiling point fraction). On the other hand, the catalytically cracked gasoline fraction used in the feed oil will tend to have a higher olefin content in its light gasoline fraction (low boiling point fraction). The catalytically cracked gasoline fraction may therefore be distilled into a light gasoline fraction and heavy gasoline fraction, with the heavy gasoline fraction with a relatively low olefin content being used as the feed oil. More specifically, for example, the light gasoline fraction with a boiling point of 30-180° C. and the heavy gasoline fraction with a boiling point of 80-250° C. may be distilled beforehand, and the heavy gasoline fraction alone passed through the aforementioned hydrodesulfurization catalyst layer. This will allow more efficient hydrodesulfurization of the gasoline fraction.

The reaction pressure for the desulfurization process of this embodiment is 1-5 MPa, preferably 1-3 MPa and more preferably 1.2-2.5 MPa. If the reaction pressure is above 5 MPa, the hydrogen sulfide by-product will add to the olefins in the feed oil to produce mercaptan compounds, thereby lowering the desulfurization efficiency. If the reaction pressure is lower than 1 MPa, the hydrodesulfurization reaction will not proceed sufficiently.

The LHSV (liquid hourly space velocity) in the catalyst layer of this embodiment is 1-10 h$^{-1}$, preferably 1.5-8 h$^{-1}$ and more preferably 2-5 h$^{-1}$. If the LHSV is lower than 1 h$^{-1}$, hydrogenation of the olefins will be accelerated, resulting in a lower octane number of the product oil. If the LHSV is higher than 10 h$^{-1}$, the hydrodesulfurization reaction will not proceed satisfactorily.

The "LHSV" is the volume flow rate of the feed oil at standard state (25° C., 101, 325 Pa), per volume of catalyst layer packed with catalyst, and is expressed in units of inverse hours (h$^{-1}$).

The reaction temperature in the catalyst layer is 190-300° C., preferably 200-295° C. and more preferably 210-290° C. If the reaction temperature is lower than 190° C., it will not be possible to achieve adequate hydrodesulfurization. If the reaction temperature is above 300° C., hydrogenation of olefins will proceed rapidly, possibly leading to runaway reaction.

The hydrogen/oil ratio, which is the proportion of hydrogen gas accompanying the feed oil, is 100-600 NL/L, preferably 200-500 NL/L and more preferably 250-450 NL/L. If the hydrogen/oil ratio is smaller than 100 NL/L it will not be possible to adequately remove the hydrogen sulfide in the system, thus making it impossible to prevent addition of hydrogen sulfide to the olefins. If the hydrogen/oil ratio is larger than 600 NL/L, the gasoline fractions will not make sufficient contact with the catalyst, making it impossible to achieve the desired reactivity, and requiring an economically undesirable size of equipment investment.

The units of "NL" representing the hydrogen volume in the hydrogen/oil ratio is the hydrogen volume "L" at standard state (0° C., 101, 325 Pa).

According to this embodiment, the reaction conditions are adjusted within the aforementioned range to achieve desulfurization efficiency of at least 90% desulfurization efficiency and more preferably at least 93%, and an olefin hydrogenation rate of no greater than 40%. This will yield a sulfur-free gasoline stock from the product oil, while maintaining a high octane number for the gasoline stock. If the desulfurization efficiency or olefin hydrogenation rate is outside of the aforementioned range, the effect of the invention of high hydrodesulfurization selectivity will become less significant.

The product oil obtained in this embodiment preferably has a sulfur content of no greater than 10 ppm by weight, and more preferably no greater than 5 ppm by weight. A sulfur content of the product oil of no greater than 10 ppm by weight will make it possible to obtain a sulfur-free gasoline stock from the product oil, while minimizing the effect on the exhaust gas purifier of the gasoline engine.

The apparatus used for hydrodesulfurization of the feed oil may have any desired construction. A single catalyst layer-packed reaction column may be used, or a plurality may be used in combination. In order to lower the hydrogen sulfide concentration in the reaction column, a gas/liquid separator or other type of hydrogen sulfide removing device may be situated before the reaction column, or between multiple reaction columns.

The reaction system for the hydrodesulfurization treatment apparatus used for this embodiment may be a fixed-bed system. Specifically, the hydrogen may be in a countercurrent or cocurrent with respect to the feed oil, or it may be in a combination of countercurrent and cocurrent with respect to multiple reaction columns. A common setup is a downflow system, with both the gas and liquid in a cocurrent. The reaction column may be constructed with multiple catalyst beds, and the hydrogen gas (quenching hydrogen) may be injected between the catalyst beds for removal of reaction heat or to increase the hydrogen pressure.

According to the desulfurization process of this embodiment, hydrogen gas is introduced with the feed oil, as mentioned above. The method of introducing the hydrogen gas may be either of the following two methods:

(1) Injection before the reaction column (the reaction column in which the feed oil is initially introduced).

(2) Injection between different catalyst beds or, in the case of multiple reaction columns, between different reaction columns.

According to this embodiment, either method (1) or a combination of both methods (1) and (2) may be employed, but the hydrogen gas is preferably introduced by both methods (1) and (2). In order to more reliably remove hydrogen sulfide by-product and more efficiently promote the hydrodesulfurization reaction, preferably no greater than 90 vol % of the total amount of injected hydrogen gas is injected by method (1), while the rest of the hydrogen gas is injected by method (2). The amount of hydrogen gas injected by method (1) is more preferably no greater than 80 vol %, even more preferably no greater than 70 vol % and most preferably no greater than 60 vol % of the total amount of injected hydrogen gas. In other words, a greater amount of the remainder of hydrogen gas injected by method (2) will tend to allow the effect of hydrogen gas addition to be exhibited more efficiently. The entrance port of the first reaction column referred to here may be situated before the heating furnace which accomplishes heating of the feed oil to the prescribed temperature, or at the exit port of the heating furnace.

The desulfurization process of the embodiment described above can satisfactorily reduce the content of sulfur in product oils, and is therefore very useful for production of sulfur-free gasoline. In addition, the desulfurization process maintains a high octane number in the catalytically cracked gasoline fraction, avoiding any notable reduction in the octane number, and therefore can yield gasoline with very high combustion efficiency. Thus, a gasoline product manufactured using an product oil obtained by the desulfurization process of this embodiment can contribute to alleviating the environmental burden.

An product oil obtained by the desulfurization process of this embodiment will tend to have a low content of thiols such as mercaptans if the sulfur content of the feed oil is relatively low, thus eliminating the need for sweetening in latter steps. This also applies when using a hydrodesulfurization apparatus which performs the reaction in two stages. However, since the product oil will sometimes contain thiols, a gasoline sweetening apparatus is preferably installed either after the reaction column of the hydrodesulfurization apparatus, or after the hydrodesulfurization apparatus itself.

The gasoline stock containing the catalytically cracked gasoline obtained by the desulfurization process of this embodiment may be used alone as a gasoline product, but normally it is preferably used as a gasoline product in admixture with another gasoline stock. Various other gasoline stocks may be used including, for example, desulfurized straight run gasoline, thermally cracked gasoline, catalytically reformed gasoline, isomerized gasoline, alkylated gasoline, residues remaining after removing aromatic hydrocarbons from catalytically reformed gasoline (sulfolane raffinate), and the like.

Among these gasoline stocks other than catalytically cracked gasoline, there is preferred catalytically reformed gasoline having an Research Octane Number (RON) of 95 or greater. The proportion of catalytically reformed gasoline in the gasoline product is preferably adjusted to 20-50 vol %. In this case, the mixing proportion of the gasoline stock obtained by the desulfurization process of this embodiment will be preferably no greater than 60 vol %. If the mixing proportion of the gasoline stock is within this range, it will be possible to obtain a large amount of high-quality, low-sulfur gasoline product with a high octane number, having a sulfur content of no greater than 10 ppm by weight and an olefin content of at least 10 wt %.

As explained above, the hydrodesulfurization catalyst of the invention and the hydrodesulfurization process employing it can prevent olefin hydrogenation and thus adequately inhibit octane number reduction. The aforementioned inhibiting effect is exhibited even more notably when carrying out hydrodesulfurization of feed oil containing catalytically cracked gasoline with a high olefin content. The hydrodesulfurization catalyst and hydrodesulfurization process are therefore highly selective for hydrodesulfurization. Thus, by applying the hydrodesulfurization catalyst of the invention and the hydrodesulfurization process employing it, it is possible, without major investment in equipment, to efficiently produce a gasoline stock allowing production of sulfur-free gasoline having a sulfur content of no greater than 10 ppm by weight.

EXAMPLES

The invention will now be explained in greater detail by examples, with the understanding that these examples are in no way limitative on the invention.

Example 1

In a steam jacket-equipped reactor there were mixed 400 g of aqueous aluminum sulfate (3.9 wt % alumina concentration) and 500 g of sodium aluminate (1.9 wt % alumina concentration) while heating at 60° C., to obtain an alumina hydrate slurry. After filtering and washing the slurry, 50 ml of 27% aqueous ammonia and 100 ml of distilled water were added and the mixture was stirred at 90° C. for 12 hours to obtain alumina hydrate with an alumina concentration of 24%. The obtained hydrate was concentrated and kneaded while maintaining the temperature at 95° C., and then 110 mL of aqueous copper nitrate containing 140.0 g of copper (II) nitrate pentahydrate was added.

After kneading, the mixture was extrusion molded into a 1/16 inch columnar shape, dried at 110° C. for 2 hours and then fired at 550° C. for 1 hour to obtain a support. The copper content in the support was 5.1 wt % based on oxides.

Next, 330 mL of water was added to 150 g of ammonium molybdenate (($NH_4$)$_6$$Mo_7$$O_{24}$.4$H_2$O), the mixture was heated to dissolution, and then 69 g of basic nickel carbonate ($NiCO_3$.2Ni(OH)$_2$.4$H_2$O) was added to the aqueous solution to prepare an impregnating solution. After then impregnating it into 500 g of support by the pore-filling method, the support was fired at 550° C. for 2 hours. The specific area of the catalyst obtained in this manner was 240 $m^3$/g, and the pore volume was 0.49 mL/g. The supported metals were 4.9 wt % Ni as NiO and 14.7 wt % Mo as $MoO_3$.

A 50 g portion of the obtained catalyst was packed into a fixed-bed downflow bench reactor, and then the temperature was gradually increased to 300° C. in a hydrogen stream containing 5 vol % hydrogen sulfide, for 4 hours of pre-sulfurization. Next, the temperature was lowered to 230° C., and catalytically cracked gasoline was allowed to run through for hydrodesulfurization under conditions with a temperature of 240° C., a pressure of 2 MPa, an LHSV of 4 $h^{-1}$ and a hydrogen/oil ratio of 250 NL/L. The properties of the catalytically cracked gasoline were a density of 0.733 g/$cm^3$ at 15° C., a boiling point of 31-198° C., a RON of 91, a sulfur content of 90 ppm by weight and an olefin content of 36 vol %.

As a result, the sulfur content of the obtained product oil was 3.4 ppm by weight (96% desulfurization efficiency), and the olefin hydrogenation rate was 13% (RON=89).

Example 2

A catalyst was prepared in the same manner as in the same manner as Example 1, except that aqueous zinc nitrate containing 155.0 g of zinc (II) nitrate heptahydrate was used instead of the aqueous copper nitrate containing 140.0 g of copper (II) nitrate pentahydrate. The zinc content of the support was 4.9 wt % in terms of oxides, and the catalyst had a specific area of 220 $m^3$/g and a pore volume of 0.44 mL/g. The supported metals were 4.8 wt % Ni as NiO and 14.8 wt % Mo as $MoO_3$.

A 50 g portion of the obtained catalyst was subjected to pre-sulfurization in the same manner as Example 1. This was followed by hydrodesulfurization under the same conditions as in Example 1. As a result, the sulfur content of the obtained product oil was 3.9 ppm by weight (96% desulfurization efficiency), and the olefin hydrogenation rate was 14% (RON=89).

Example 3

An alumina hydrate was prepared in the same manner as Example 1, and after concentrating and kneading while maintaining the temperature at 95° C., it was extrusion molded into a 1/16 inch columnar shape, dried at 110° C. for 2 hours and then fired at 550° C. for 1 hour to obtain a support. After impregnating 310 mL of aqueous copper nitrate containing 87.5 g of copper (II) nitrate pentahydrate into 500 g of the obtained support by the pore-filling method, the support was fired at 550° C. for 1 hour. The copper content in the support was 5.2 wt % based on oxides.

Next, 220 mL of water was added to 100 g of ammonium molybdenate (($NH_4$)$_6$$Mo_7$$O_{24}$.4$H_2$O), the mixture was heated to dissolution, and then 46 g of basic nickel carbonate ($NiCO_3$.2Ni(OH)$_2$.4$H_2$O) was added to the aqueous solution to prepare an impregnating solution. After then impregnating it into 330 g of support by the pore-filling method, the support was fired at 550° C. for 2 hours. The specific area of the catalyst obtained in this manner was 220 $m^3$/g, and the pore volume was 0.43 mL/g. The supported metals were 5.0 wt % Ni as NiO and 15.1 wt % Mo as $MoO_3$.

A 50 g portion of the obtained catalyst was subjected to pre-sulfurization in the same manner as Example 1. This was followed by hydrodesulfurization under the same conditions as in Example 1. As a result, the sulfur content of the obtained product oil was 4.7 ppm by weight (95% desulfurization efficiency), and the olefin hydrogenation rate was 15% (RON=89).

Example 4

A catalyst was prepared in the same manner as Example 3, except that 119.7 g of zinc (II) nitrate heptahydrate was used instead of 87.5 g of copper (II) nitrate pentahydrate. The zinc content of the support was 4.9 wt % in terms of oxides, and the catalyst had a specific area of 220 $m^3$/g and a pore volume of 0.43 mL/g. The supported metals were 5.0 wt % Ni as NiO and 15.0 wt % Mo as $MoO_3$.

A 50 g portion of the obtained catalyst was subjected to pre-sulfurization in the same manner as Example 1. This was followed by hydrodesulfurization under the same conditions as in Example 1. As a result, the sulfur content of the obtained product oil was 4.9 ppm by weight (95% desulfurization efficiency), and the olefin hydrogenation rate was 17% (RON=88).

Example 5

A catalyst was prepared in the same manner as Example 1, except that 200 mL of an aqueous solution containing 9.6 g of ytterbium acetate tetrahydrate was used instead of the 110 mL of aqueous copper nitrate containing 140.0 g of copper (II) nitrate pentahydrate. The ytterbium content of the support was 1.0 wt % in terms of oxides, and the catalyst had a specific area of 250 $m^3$/g and a pore volume of 0.48 mL/g. The supported metals were 4.9 wt % Ni as NiO and 14.9 wt % Mo as $MoO_3$.

A 50 g portion of the obtained catalyst was subjected to pre-sulfurization in the same manner as Example 1. This was followed by hydrodesulfurization under the same conditions as in Example 1. As a result, the sulfur content of the obtained product oil was 3.0 ppm by weight (97% desulfurization efficiency), and the olefin hydrogenation rate was 11% (RON=90).

Example 6

A catalyst was prepared in the same manner as Example 1, except that 200 mL of an aqueous solution containing 13.0 g of yttrium acetate tetrahydrate was used instead of the 110 mL of aqueous copper nitrate containing 140.0 g of copper (II) nitrate pentahydrate. The yttrium content of the support was 1.1 wt % in terms of oxides, and the catalyst had a specific area of 245 $m^3$/g and a pore volume of 0.44 mL/g. The supported metals were 4.9 wt % Ni as NiO and 14.9 wt % Mo as $MoO_3$.

A 50 g portion of the obtained catalyst was subjected to pre-sulfurization in the same manner as Example 1. This was followed by hydrodesulfurization under the same conditions as in Example 1. As a result, the sulfur content of the obtained product oil was 3.3 ppm by weight (96% desulfurization efficiency), and the olefin hydrogenation rate was 12% (RON=90).

Example 7

A catalyst was prepared in the same manner as Example 1, except that 200 mL of an aqueous solution containing 10.3 g of cerium acetate monohydrate was used instead of the 110 mL of aqueous copper nitrate containing 140.0 g of copper (II) nitrate pentahydrate. The cerium content of the support was 1.2 wt % in terms of oxides, and the catalyst had a specific area of 240 m$^3$/g and a pore volume of 0.46 mL/g. The supported metals were 4.7 wt % Ni as NiO and 14.7 wt % Mo as MoO$_3$.

A 50 g portion of the obtained catalyst was subjected to pre-sulfurization in the same manner as Example 1. This was followed by hydrodesulfurization under the same conditions as in Example 1. As a result, the sulfur content of the obtained product oil was 4.1 ppm by weight (95% desulfurization efficiency), and the olefin hydrogenation rate was 14% (RON=89).

Example 8

A catalyst was prepared in the same manner as Example 3, except that 310 mL of an aqueous solution containing 5.4 g of ytterbium acetate tetrahydrate was used instead of the 310 mL of aqueous copper nitrate containing 87.5 g of copper (II) nitrate pentahydrate. The ytterbium content of the support was 1.2 wt % in terms of oxides, and the catalyst had a specific area of 250 m$^3$/g and a pore volume of 0.48 mL/g. The supported metals were 5.1 wt % Ni as NiO and 14.9 wt % Mo as MoO$_3$.

A 50 g portion of the obtained catalyst was subjected to pre-sulfurization in the same manner as Example 1. This was followed by hydrodesulfurization under the same conditions as in Example 1. As a result, the sulfur content of the obtained product oil was 4.8 ppm by weight (95% desulfurization efficiency), and the olefin hydrogenation rate was 16% (RON=88).

Example 9

A catalyst was prepared in the same manner as Example 1, except that 158 g of cobalt nitrate (Co(NO$_3$)$_2$.6H$_2$O) was used instead of the 69 g of basic nickel carbonate (NiCO$_3$.2Ni(OH)$_2$.4H$_2$O). The copper content of the support was 5.0 wt % in terms of oxides, and the catalyst had a specific area of 230 m$^3$/g and a pore volume of 0.43 mL/g. The supported metals were 4.9 wt % Co as CoO and 15.0 wt % Mo as MoO$_3$.

A 50 g portion of the obtained catalyst was subjected to pre-sulfurization in the same manner as Example 1. This was followed by hydrodesulfurization under the same conditions as in Example 1. As a result, the sulfur content of the obtained product oil was 3.0 ppm by weight (97% desulfurization efficiency), and the olefin hydrogenation rate was 12% (RON=90).

Example 10

A catalyst was prepared in the same manner as Example 2, except that 158 g of cobalt nitrate (Co(NO$_3$)$_2$.6H$_2$O) was used instead of the 69 g of basic nickel carbonate (NiCO$_3$.2Ni(OH)$_2$.4H$_2$O). The zinc content of the support was 5.1 wt % in terms of oxides, and the catalyst had a specific area of 230 m$^3$/g and a pore volume of 0.43 mL/g. The supported metals were 4.9 wt % Co as CoO and 14.9 wt % Mo as MoO$_3$.

A 50 g portion of the obtained catalyst was subjected to pre-sulfurization in the same manner as Example 1. This was followed by hydrodesulfurization under the same conditions as in Example 1. As a result, the sulfur content of the obtained product oil was 3.1 ppm by weight (97% desulfurization efficiency), and the olefin hydrogenation rate was 12% (RON=90).

Example 11

A catalyst was prepared in the same manner as Example 5, except that 158 g of cobalt nitrate (Co(NO$_3$)$_2$.6H$_2$O) was used instead of the 69 g of basic nickel carbonate (NiCO$_3$.2Ni(OH)$_2$.4H$_2$O). The ytterbium content of the support was 1.0 wt % in terms of oxides, and the catalyst had a specific area of 235 m$^3$/g and a pore volume of 0.44 mL/g. The supported metals were 4.8 wt % Co as CoO and 14.8 wt % Mo as MoO$_3$.

A 50 g portion of the obtained catalyst was subjected to pre-sulfurization in the same manner as Example 1. This was followed by hydrodesulfurization under the same conditions as in Example 1. As a result, the sulfur content of the obtained product oil was 2.1 ppm by weight (98% desulfurization efficiency), and the olefin hydrogenation rate was 10% (RON=90).

Example 12

A catalyst was prepared in the same manner as Example 7, except that 158 g of cobalt nitrate (Co(NO$_3$)$_2$.6H$_2$O) was used instead of the 69 g of basic nickel carbonate (NiCO$_3$.2Ni(OH)$_2$.4H$_2$O). The cerium content of the support was 1.0 wt % in terms of oxides, and the catalyst had a specific area of 240 m$^3$/g and a pore volume of 0.43 mL/g. The supported metals were 4.8 wt % Co as CoO and 15.0 wt % Mo as MoO$_3$.

A 50 g portion of the obtained catalyst was subjected to pre-sulfurization in the same manner as Example 1. This was followed by hydrodesulfurization under the same conditions as in Example 1. As a result, the sulfur content of the obtained product oil was 2.4 ppm by weight (97% desulfurization efficiency), and the olefin hydrogenation rate was 10% (RON=90).

Example 13

A catalyst was prepared in the same manner as Example 6, except that 158 g of cobalt nitrate (Co(NO$_3$)$_2$.6H$_2$O) was used instead of the 69 g of basic nickel carbonate (NiCO$_3$.2Ni(OH)$_2$.4H$_2$O). The yttrium content of the support was 1.1 wt % in terms of oxides, and the catalyst had a specific area of 240 m$^3$/g and a pore volume of 0.45 mL/g. The supported metals were 4.9 wt % Co as CoO and 14.9 wt % Mo as MoO$_3$.

A 50 g portion of the obtained catalyst was subjected to pre-sulfurization in the same manner as Example 1. This was followed by hydrodesulfurization under the same conditions as in Example 1. As a result, the sulfur content of the obtained product oil was 2.8 ppm by weight (97% desulfurization efficiency), and the olefin hydrogenation rate was 11% (RON=90).

Example 14

A catalyst was prepared in the same manner as Example 8, except that 158 g of cobalt nitrate (Co(NO$_3$)$_2$.6H$_2$O) was used instead of the 46 g of basic nickel carbonate (NiCO$_3$.2Ni(OH)$_2$.4H$_2$O). The ytterbium content of the support was 1.0 wt % in terms of oxides, and the catalyst had a specific area of 230 m$^3$/g and a pore volume of 0.46 mL/g. The supported metals were 5.0 wt % Co as CoO and 14.9 wt % Mo as MoO$_3$.

A 50 g portion of the obtained catalyst was subjected to pre-sulfurization in the same manner as Example 1. This was followed by hydrodesulfurization under the same conditions as in Example 1. As a result, the sulfur content of the obtained product oil was 3.5 ppm by weight (96% desulfurization efficiency), and the olefin hydrogenation rate was 13% (RON=89).

Example 15

A catalyst was prepared in the same manner as Example 14, except that 200 mL of an aqueous solution containing 10.3 g of cerium acetate monohydrate was used instead of the 310 mL of an aqueous solution containing 5.4 g of ytterbium acetate tetrahydrate. The cerium content of the support was 1.0 wt % in terms of oxides, and the catalyst had a specific area of 230 m$^3$/g and a pore volume of 0.46 mL/g. The supported metals were 4.9 wt % Co as CoO and 14.9 wt % Mo as MoO$_3$.

A 50 g portion of the obtained catalyst was subjected to pre-sulfurization in the same manner as Example 1. This was followed by hydrodesulfurization under the same conditions as in Example 1. As a result, the sulfur content of the obtained product oil was 3.5 ppm by weight (96% desulfurization efficiency), and the olefin hydrogenation rate was 12% (RON=90).

Comparative Example 1

An alumina support was obtained in the same manner as Example 3, except that no aqueous copper nitrate was added. Next, 330 mL of water was added to 150 g of ammonium molybdenate ((NH$_4$)$_6$Mo$_7$O$_{24}$.4H$_2$O), the mixture was heated to dissolution, and then 69 g of basic nickel carbonate (NiCO$_3$.2Ni(OH)$_2$.4H$_2$O) was added to the aqueous solution to prepare an impregnating solution. After then impregnating it into 500 g of support by the pore-filling method, the support was fired at 550° C. for 2 hours. The specific area of the obtained catalyst was 235 m$^3$/g, and the pore volume was 0.46 mL/g. The supported metals were 4.8 wt % Ni as NiO and 14.8 wt % Mo as MoO$_3$.

A 50 g portion of the obtained catalyst was subjected to pre-sulfurization in the same manner as Example 1. This was followed by hydrodesulfurization under the same conditions as in Example 1. As a result, the sulfur content of the obtained product oil was 10.5 ppm by weight (88% desulfurization efficiency), and the olefin hydrogenation rate was 44% (RON=78).

What is claimed is:

1. A hydrodesulfurization catalyst for gasoline fractions, comprising:
    a support comprising mainly alumina;
    a metal oxide containing at least one metal selected from the group consisting of yttrium, scandium and lanthanoid-based metals, for modification of said support;
    as active metals, at least one metal selected from the group consisting of Group VIA metals loaded at 10-20 wt % in terms of its metal oxide with respect to the total weight of said hydrodesulfurization catalyst; and
    at least one metal selected from the group consisting of Group VIII metals loaded at 3-6 wt % in terms of its metal oxide with respect to the total weight of said hydrodesulfurization catalyst,
    wherein a surface area of the hydrodesulfurization catalyst is at least 220 m$^2$/g.

2. The hydrodesulfurization catalyst for gasoline fractions according to claim 1, wherein the ratio of the weight of said metal oxide with respect to the weight of said support is 0.3-30 wt %.

3. The hydrodesulfurization catalyst for gasoline fractions according to claim 1, wherein said metal oxide is a metal oxide containing at least one metal selected from the group consisting of yttrium, lanthanum, cerium, neodymium, samarium and ytterbium.

4. The hydrodesulfurization catalyst for gasoline fractions according to claim 1, wherein said metal oxide is a metal oxide containing at least one metal selected from the group consisting of yttrium, cerium and ytterbium.

5. The hydrodesulfurization catalyst for gasoline fractions according to claim 1, wherein said metal oxide is ytterbium oxide or cerium oxide.

6. The hydrodesulfurization catalyst for gasoline fractions according to claim 1, wherein said metal oxide is ytterbium oxide.

7. The hydrodesulfurization catalyst for gasoline fractions according to claim 1, wherein said active metal comprises cobalt-molybdenum and/or nickel-molybdenum.

8. The hydrodesulfurization catalyst for gasoline fractions according to claim 1, prepared by a process comprising the steps of:
    adding said metal oxide or a compound generating said metal oxide by calcinations to an alumina precursor;
    calcining the mixture to yield said support modified with said metal oxide; and
    loading said active metals onto said support.

* * * * *